United States Patent
Harrang (10) Patent No.: US 9,451,517 B2
(45) Date of Patent: Sep. 20, 2016

(54) METHOD AND SYSTEM FOR PATH PREDICTIVE CONGESTION AVOIDANCE

(71) Applicant: EDEN ROCK COMMUNICATIONS, LLC, Bothell, WA (US)

(72) Inventor: Jeffrey Paul Harrang, Bothell, WA (US)

(73) Assignee: Nokia Solutions and Networks Oy, Espoo (FI)

( * ) Notice: Subject to any disclaimer, the term of this patent is extended or adjusted under 35 U.S.C. 154(b) by 71 days.

(21) Appl. No.: 14/312,606

(22) Filed: Jun. 23, 2014

(65) Prior Publication Data

US 2015/0271727 A1 Sep. 24, 2015

Related U.S. Application Data

(60) Provisional application No. 61/955,724, filed on Mar. 19, 2014.

(51) Int. Cl.
| | |
|---|---|
| *H04L 1/00* | (2006.01) |
| *H04W 36/22* | (2009.01) |
| *H04L 12/803* | (2013.01) |
| *H04W 28/26* | (2009.01) |
| *H04L 12/801* | (2013.01) |
| *H04W 40/18* | (2009.01) |
| *H04W 36/24* | (2009.01) |

(52) U.S. Cl.
CPC ............ *H04W 36/22* (2013.01); *H04L 47/122* (2013.01); *H04W 28/26* (2013.01); *H04L 47/127* (2013.01); *H04L 47/14* (2013.01); *H04W 36/245* (2013.01); *H04W 40/18* (2013.01)

(58) Field of Classification Search
CPC . H04W 36/22; H04W 40/18; H04W 36/245; H04W 28/26; H04L 47/127; H04L 47/122; H04L 47/14
See application file for complete search history.

(56) References Cited

U.S. PATENT DOCUMENTS

| | | | |
|---|---|---|---|
| 6,188,905 B1 | 2/2001 | Rudrapatna et al. | |
| 6,792,273 B1 | 9/2004 | Tellinger et al. | |
| 2004/0058678 A1* | 3/2004 | deTorbal | H04W 36/32 455/437 |
| 2004/0192341 A1 | 9/2004 | Wang et al. | |
| 2011/0041155 A1* | 2/2011 | Wakabayashi | H04H 20/57 725/62 |
| 2011/0044264 A1* | 2/2011 | Chen | H04W 36/245 370/329 |
| 2011/0275378 A1* | 11/2011 | Kwon | H04W 36/30 455/437 |
| 2012/0142355 A1* | 6/2012 | Jha | H04W 36/0061 455/436 |
| 2012/0178455 A1* | 7/2012 | Sato | H04W 36/32 455/436 |
| 2014/0187238 A1* | 7/2014 | Tsuda | H04M 11/00 455/425 |
| 2014/0256335 A1* | 9/2014 | Kobayashi | H04W 16/22 455/450 |
| 2015/0038180 A1* | 2/2015 | Quick, Jr. | H04W 76/06 455/458 |

(Continued)

FOREIGN PATENT DOCUMENTS

| | | | | |
|---|---|---|---|---|
| FI | WO 2013050646 A2 * | 4/2013 | | H04W 24/02 |
| WO | WO 2013/050646 A2 | 4/2013 | | |

OTHER PUBLICATIONS

International Search Report and Written Opinion for PCT/US2014/043733, filed Jun. 23, 2014.

*Primary Examiner* — Clemence Han (57) ABSTRACT

A method for path predictive congestion avoidance includes receiving activity data for a plurality of cells, determining dominant paths for each of a plurality of cells based on the activity data, predicting a future network condition based on the dominant paths, and allocating network resources based on the predicted future network condition.

29 Claims, 8 Drawing Sheets

(56) References Cited

U.S. PATENT DOCUMENTS

2015/0126193 A1* 5/2015 Huang .............. H04W 36/0083
455/436

2015/0215742 A1* 7/2015 Ikeda .................... H04W 68/04
455/456.1

* cited by examiner

METHOD AND SYSTEM FOR PATH PREDICTIVE CONGESTION AVOIDANCE

CROSS-REFERENCES TO RELATED APPLICATIONS

The present invention claims priority to U.S. Provisional Application No. 61/955,724, filed Mar. 19, 2014, which is incorporated by reference herein for all purposes.

BACKGROUND OF THE INVENTION

Wireless cellular deployments often are deployed with clusters of bordering cells in an extended metro or regional coverage area. The ability to support ubiquitous service coverage provided by contiguous fixed arrays of cells over populated areas is an important aspect of some mobile wireless services.

As mobile wireless users move about they tend to follow paths constrained by transportation infrastructure such as roads, paths, highways, rail lines, bridges, ferry routes, etc. These route constraints translate to handover sequences between adjoining cells that form predominant paths across sections of a regional network. It can also be understood that motion across cells containing major transportation arterials is highly correlated and predictable over periods of time that can last from minutes to hours or even days.

Another intrinsic consequence of dividing a wireless coverage network into a grid of cells with mobile users is a distribution in network load presented by varying density of users between the cells. Some cells will be lightly loaded while others are more heavily loaded. These patterns tend to shift during the day, often in a complex fashion. At times, there may be enough activity within a cell to approach or exceed resource capacity, leading to undesirable overload scenarios and poor user experience.

Because the mobility of users is complex, it is usually treated as quasi-random motion and cell resource overload is managed reactively based on refinements to initial planning, customer complaints and periodic drive testing. Autonomous methods to proactively predict and prevent resource overload would be useful to reduce operator costs and improve user satisfaction.

BRIEF SUMMARY OF THE INVENTION

Embodiments of the present disclosure facilitate prediction of mobility patterns across a network of clustered wireless cells. By knowing what the current traffic load is in one part of the network, a radio resource element can anticipate the load in other parts of the network, taking preemptive action to avoid potential overload scenarios. The radio resource element may also be able to coordinate look-ahead resource setup and reservation to improve network performance.

Embodiments relate to a system and set of methods by which a central or distributed radio resource controller uses information related to handover between network cells to build maps of predominant paths of mobility as users transit the network. The predominant paths may be used to predict pending overload scenarios that will occur when users in one part of the network move to another part of the network. Another possible use of path knowledge is to proactively arrange for network resources in advance of their immediate need in order to reduce system response latency and improve reliability of assigning resources to mobile users as they transit the network.

In an embodiment, a method for a wireless communications network includes receiving activity data for a plurality of cells, determining dominant paths for each of a plurality of cells based on the activity data, predicting a future network condition based on the dominant paths, and allocating network resources based on the predicted future network condition. The activity data may include handover information for the plurality of cells.

In an embodiment, the handover information includes identities of cells to which user equipment was handed-in from a target cell of the plurality of cells, the identities of one or more cells to which user equipment was handed-out from the target cell, a quantity of hand-in events to the target cell within a time period, and a quantity of hand-out events from the target cell within the time period. The handover information may be recorded in a transit event record that further includes identities of user equipment associated with the hand-in and hand-out events, transit times for the user equipment, and transitions between idle and active states for the user equipment. The handover information may include times at which user equipment were handed into and out of a target cell of the plurality of cells within a time period.

In an embodiment, determining dominant paths includes determining a cell to which a majority of user equipment occupying a target cell are handed-out within a time period, and designating a path from the target cell to the cell to which the majority of user equipment were handed-out to as the dominant path. Determining dominant paths may further include determining a cell from which a majority of user equipment occupying a target cell are handed-in within a time period, and designating a path from the cell to which the majority of user equipment were handed-in to the target cell as the dominant path.

Determining dominant paths may include determining a first order path from the target cell and determining a second order path from the target cell, wherein the first order path is a path to a cell which received the largest number of handouts from the target cell within the time period, and the second order path is a path to a cell which received the second largest number of handouts from the target cell within the time period. Determining dominant paths may further include correlating a plurality of transit events across the target cell with identities of user equipment which performed the transit events.

An embodiment may determine a transit latency value for the target cell based on the correlated plurality of transit events. Predicting the future network conditions may include simulating movement of user equipment along the dominant paths using average transit times. The simulated movement may be based on current locations of user equipment in the network.

Allocating network resources may include handing over user equipment from cells of the plurality of cells that are predicted to be overloaded, and reserving resources for the plurality of cells to account for the predicted future network conditions. The dominant paths may include linked lists of neighbor cells sharing dominant path designators.

DETAILED DESCRIPTION OF THE INVENTION

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
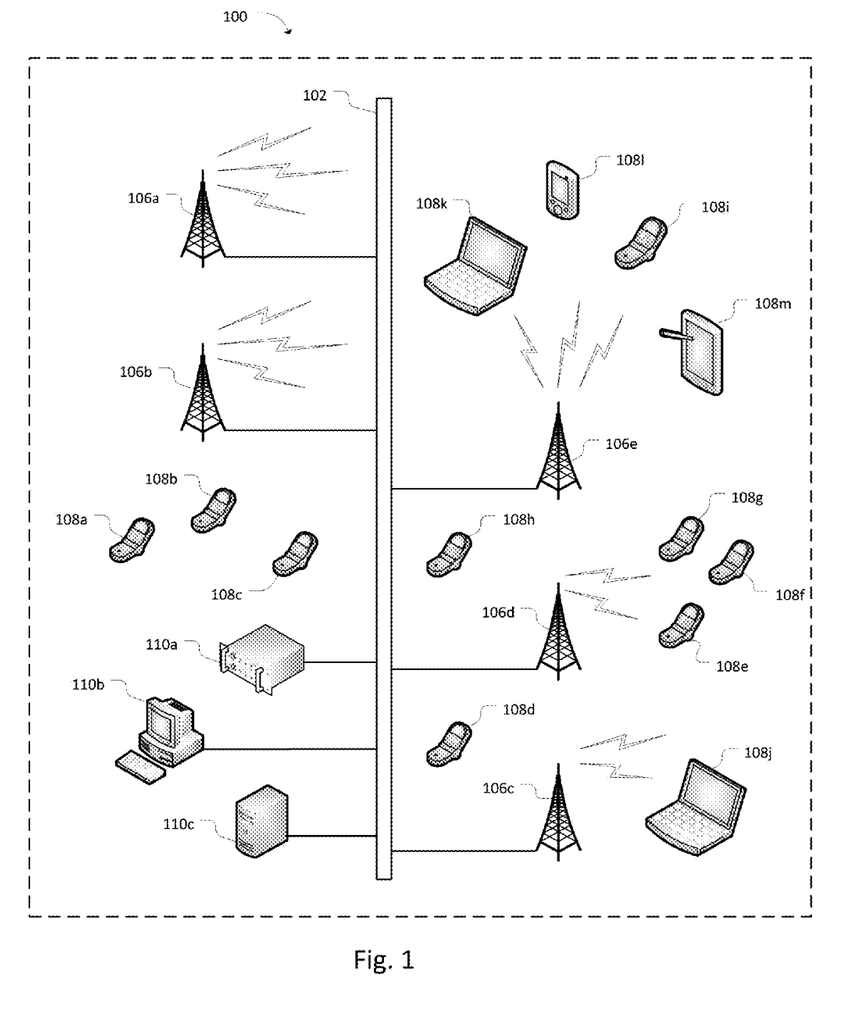
FIG. 1 illustrates a wireless communication system according to an embodiment.

FIG. 1 illustrates a networked computing system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
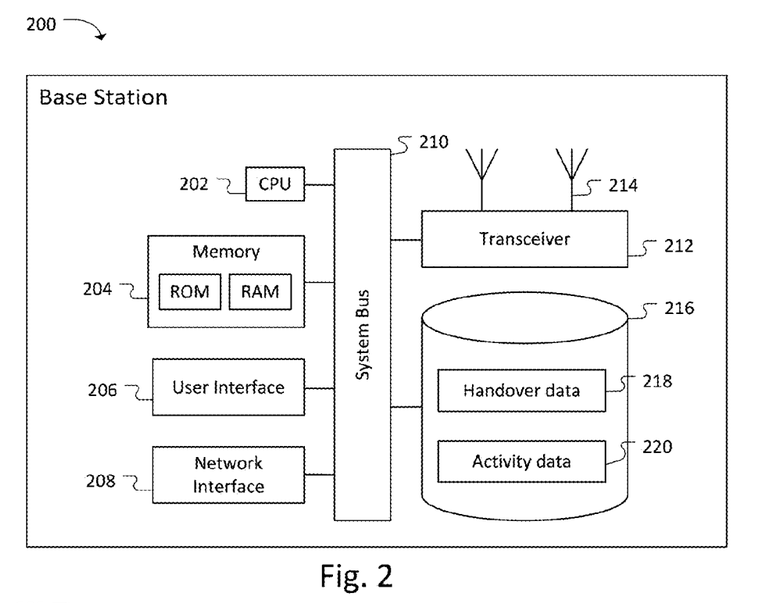
FIG. 2 illustrates a base station according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send and receive data to and from other network elements through network interface 208. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data storage 216 and CPU 202 which executes the program. In an embodiment, data storage 216 may store handover data 218 and activity data 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
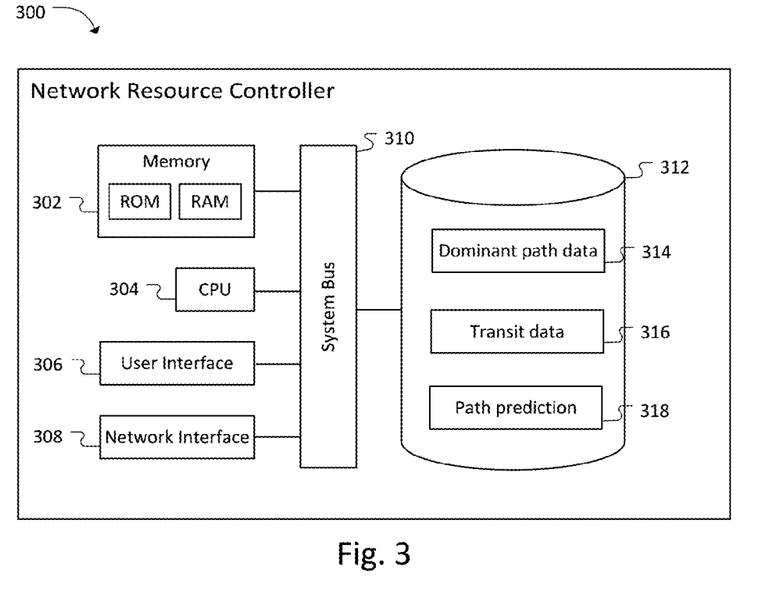
FIG. 3 illustrates a network resource controller according to an embodiment.

FIG. 3 illustrates a block diagram of an NRC 300 that may be representative of any of the network controller devices 110a-c. In an embodiment, one or more of the network controller devices 110a-c are SON controllers. The NRC 300 includes one or more processor devices including a CPU 304.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may store, for example, dominant path data 314, transit data 316, and a path prediction module 318. In addition, storage device 312 may include a dominant path prediction module that uses the dominant path data 314 and an allocation module.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

In order to mitigate the effects of a high load, a network can be manipulated to handover user terminals from more heavily loaded cells to less heavily loaded neighbors. In an embodiment, an operator may implement one or more aspect of an embodiment of this disclosure through an NRC in the operator's network. The NRC may predict upcoming resource overload events and instruct affected cells and their neighbors to cooperatively reduce the putative overloaded cell's load.

Thus, when the load rises it will be mitigated and may prevent an overload that otherwise would have occurred. The NRC network element may collect handover (HO) reports and nearest-neighbor lists from base stations serving cells associated with the NRC. From these, the NRC may determine and store dominant paths through the network as cell-to-cell sequences and transit rates in each cell.

Figure 4:
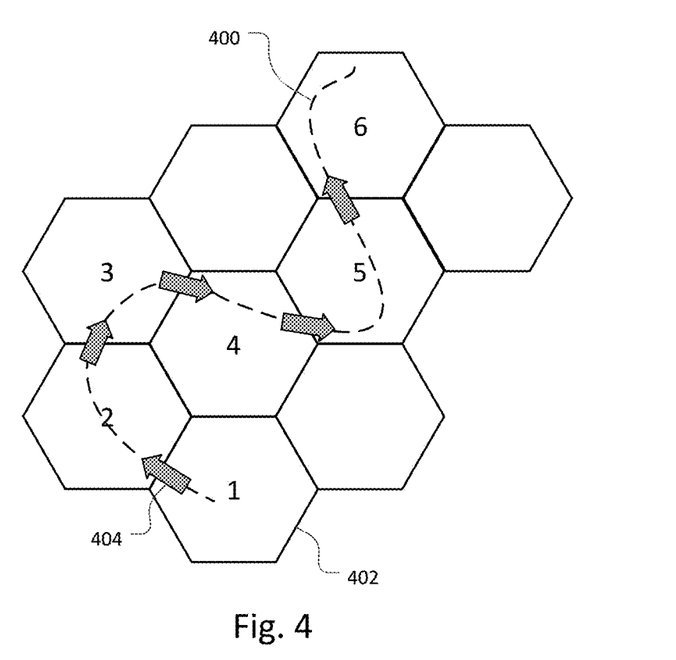
FIG. 4 illustrates an embodiment of a dominant path.

FIG. 4 illustrates an example of a dominant path 400. The dominant path extends through a plurality of cells 402 forming a grid of coverage areas represented in FIG. 4 by hexagons. The dominant path 400 may be identified by a sequence of identifiers for the cells 402, and correspond to a plurality of handovers 404 between the cells. In FIG. 4, the sequence is {1, 2, 3, 4, 5, 6}.

Paths may be formed based on mobile terminal egress from a cell, or hand-out. In an embodiment, a cell may receive handovers from dominant paths of multiple neighboring cells, and have one dominant path for egress from the cell. In other words, a dominant path may be defined by egress from cells. However, some embodiments may have more than one point of egress defining a plurality of dominant paths.

In an embodiment, each cell may represent an area served by a single antenna for a given carrier frequency. The coverage area of a cell may relate to the signal strength of a particular carrier signal, such that the boundaries of the cell are defined by points at which the signal strength crosses a threshold value, or by points at which the interference rises above a threshold value. In addition, a cell may refer to the base station at which the antenna is located. Thus, an embodiment may identify dominant paths by a cellular identifier associated with a coverage area, or by a base station identifier. It is understood that a base station site might provide multiple sectors of coverage and the identification of the path may include the base station and sector ID or other unique identifier specifying the network attachment point for the mobile devices transiting the network.

The NRC may receive periodic resource load reports from base stations, which may include data for specific user terminals. By analyzing estimates of current loads in other parts of the network the NRC can predict future user terminal distributions and potential overload scenarios by using path information as a guide to where the user terminals will be.

When a future overload condition is identified, the network attempts to reduce the current load in the cell 402 predicted to become overloaded, thus preventing or reducing the impact of the overload condition when it occurs. In an embodiment, the NRC can use derived path information and transit latency to pre-arrange for resource reservation in cells where terminals will likely be in the future. The resource reservation latency and reliability can be enhanced relative to methods that react only after an immediate need is detected.

Figure 5:
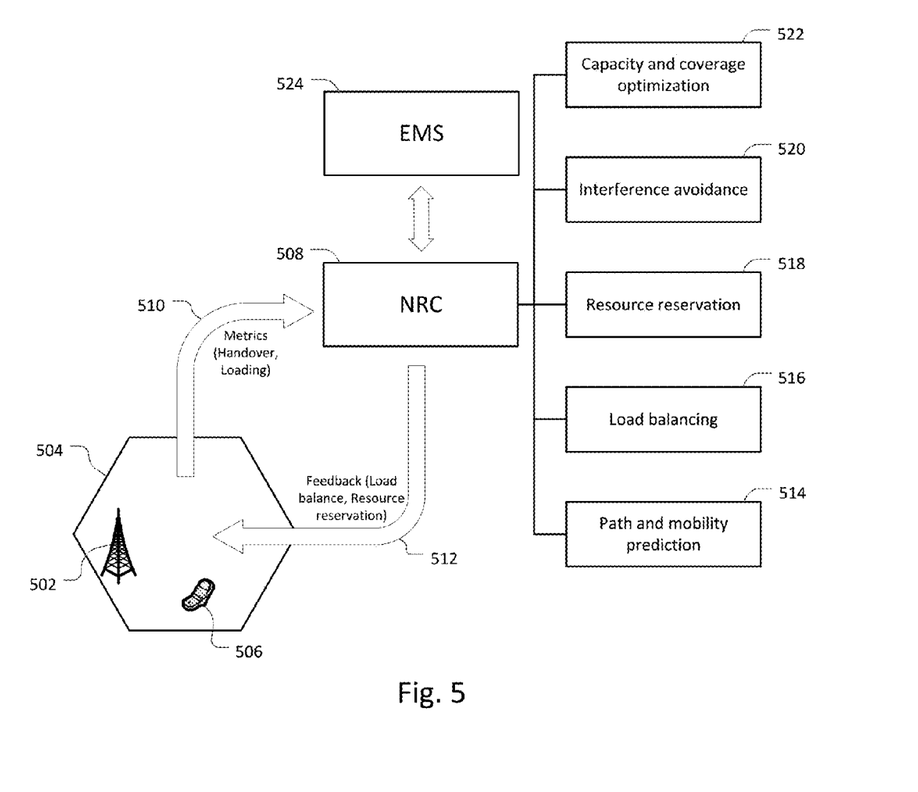
FIG. 5 illustrates a block architecture of an embodiment.

FIG. 5 shows a block architecture of an embodiment. In FIG. 5, one or more serving base station 502 (e.g. eNodeB, Access Point, etc.) provides a wireless coverage cell 504 for a plurality of mobile user equipment terminals 506 that report their radio environment conditions to the serving base station 502. The base station 502 is communicatively coupled to a multi-node NRC 508 that may be a centralized network core element communicating with a plurality of base stations, but could be distributed across a plurality of base stations.

Handover and resource metrics 510 are sent to the NRC 508 for coordinating load balancing advisory and/or resource reservation messages 512 that are distributed to the base stations 502. The NRC 508 may include a block for determining dominant paths 514, a block 516 for load balancing, a block 518 for resource reservation. In addition, NRC 508 may include a plurality of blocks for other activities such as a block 520 for performing interference avoidance and a block 522 for capacity and coverage optimization. In an embodiment, the NRC 508 may be managed by a remote element management entity 524.

Figure 6:
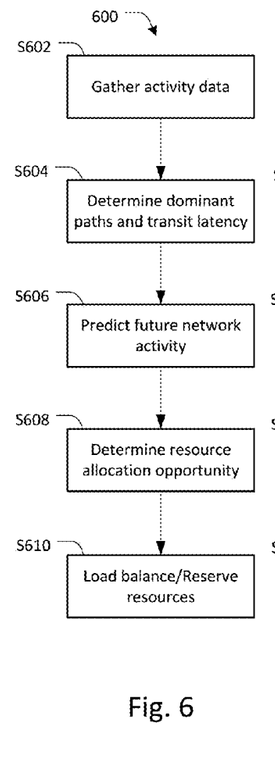
FIG. 6 illustrates an embodiment of a process of predictive congestion avoidance.

FIG. 6 illustrates an embodiment of a process 600 for predictive congestion avoidance according to an embodiment. In process 600, base stations gather activity data at S602. The activity data may include handover reports, which may in turn include both hand-in and hand-out events, user equipment terminal IDs, and timestamps of the handover activities. In an embodiment, the activity data includes resource loading reports which in turn include current user terminal occupancy data and average usage per UE. The activity data gathered at the base stations may be transmitted to an NRC.

At S604, the NRC receives the activity data, and determines dominant paths. Determining dominant paths may include identifying the cells that are most likely to be handed over to from a given target base station. Dominant paths may be determined from the handover data included in the activity data. In addition, average transit latency values may be determined for the cells based on received transit latency data.

At S606, the NRC predicts future network activity. The predicted activity may be based on projected cell occupancy and projected activity level of UEs in given cells, which in turn may be based on the dominant paths and transit latency determined at S604.

Resource allocation opportunities such as load balancing and resource reservation are identified at S608. Overload conditions may be identified at S608 when the projected load exceeds the available resources, for example radio channel throughput capacity. After overload conditions and/or resource reservation opportunities are identified, the system performs mitigating activities such as load balancing and reserving resources at S610.

Figure 7:
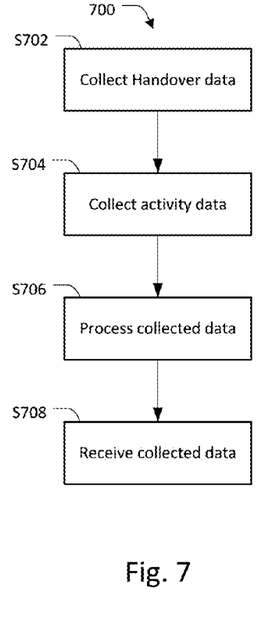
FIG. 7 illustrates an embodiment of a process of gathering activity data.

FIG. 7 illustrates a process 700 of gathering activity data according to an embodiment. Handover data is collected at S702. The handover data may be reported by UE to a base station as an aspect of typical cellular mobility operations, or may be reported for the specific purpose of predictive congestion avoidance. The handover data may include identifiers for origin and destination cells and/or base stations, as well as timestamps for times associated with handovers. In addition, the handover data may include the type of handover.

Activity data may be collected at S704. The activity data may include UE activity reports. In an embodiment, the activity reports include individual UE identities associated with the activity. The activity data may include throughput of UE in a time period, which is used to determine average throughput for UE for the cell.

In an embodiment, activity data is only collected from active terminals. Idle terminal data may therefore be excluded from the collected activity data. In some embodiments, when UE is converted from an idle state to an active state or vice versa, data regarding the state change is collected at S704.

The data collected at S702 and S704 may be processed at the base station at S706. Processing the data S706 may include filtering or parsing the data to facilitate subsequent analysis. Reports may be filtered by any of the metrics included in the stored reports including activity level, transit time across the cell (delta time between hand-in and hand-out events for a UE), source/target base station identity, etc. In another embodiment, the collected data is not processed at the base station, and the base station may send the collected data directly to an NRC. The collected and/or processed data may be received from the base station by an NRC at S708.

Figure 8:
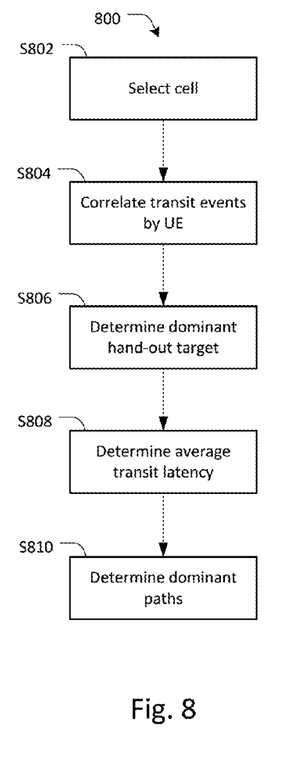
FIG. 8 illustrates an embodiment of a process of determining dominant paths and transit latency.

After data is received by an NRC at S708, the collected data may be used to determine dominant paths and transit latency. FIG. 8 illustrates a process 800 of determining dominant paths and transit latency according to an embodiment. Dominant paths and transit latency may be determined for a predetermined cluster of cells in a network, and the combination of dominant path and transit latency information may be referred to as the mobility state of the cluster.

A cell or a base station from which metrics have been received is selected at S802. For each selected cell or base station, transit events may be correlated by UE at S804. In an embodiment, correlating transit events by UE S804 includes matching hand-in events for individual UE with hand-out events. Correlating transit events may be performed for a predetermined time period, such as one hour, four hours, one day, etc.

A resulting transit event record may include at least the identities of specific UE, the total time that the UE spent at the selected cell, an identity of the cell from which UE was handed-in and a time of the hand-in, an identity of the cell to which the UE was handed-out and a time of the hand-out, a total time that the UE was attached to the target cell, times at which the UE transitioned between active and idle states, and activity levels of the UE while they are served by the selected cell. In an embodiment, UE which transitioned between active and idle states, and/or UE which spent more than a predetermined time in the target cell, may be excluded when determining a dominant path.

In another embodiment, individual UE are not specifically identified in a transit event record. In such an embodiment, a number of UE that are in a cell may be correlated with hand-out activity over a time period. For example, a hand-out rate may be determined based on a correlation between a number of UE present in a cell and hand-out events from that cell. The data in such an embodiment may be enhanced by further correlation with a time of day and day of the week. Using this data, an embodiment may determine that when a certain number of UE are present in a cell at a certain time and date, a number of hand-outs are likely to occur over a time period to particular cells. Accordingly, determining dominant paths may consider time information such as a time of day, a day of the week, etc.

Handover activity data may be analyzed to determine a transit path across a plurality of cells. At S806, handover data for a particular cell may be analyzed to determine a dominant hand-out cell which has a highest amount of associated events. The dominant hand-out cell may be the cell to which a highest number of UE were handed over to in a given time period.

In some embodiments, lower order paths may be determined as well. For example, an embodiment may generate a list of the hand-out targets for a given cell and filter that list by one or more criteria such as a percentage of hand-outs, a number of hand-outs, a rate of hand-outs, etc. In one embodiment, when the dominant hand-out target with the highest number of hand-outs in a time period is within a predetermined percentage of the second-highest hand-out target, paths may be determined for both of the cells. Similarly, in another embodiment, paths may be determined using every target that receives a percentage of hand-outs that is greater than a predetermined value such as 30% or 40%.

Each of the identified transit events has an associated transit latency that may be determined by comparing the hand-in and hand-out timestamps for each UE at S808. Transit latency data may be stored in the transit event record, which may be a memory disposed in one or more base station or NRC. In addition, an average transit latency for a given time period may be calculated and stored in a master transit event record for the base station. Average transit latencies may be determined for a plurality of paths such as the dominant path, a second order path, a third order path, and so forth.

Dominant paths are determined at S810. In an embodiment, determining a dominant path includes forming a record containing a linked list of neighbor cells sharing dominant path designators. For example, if cell A has a dominant path to cell B which has a dominant path to cell C, then the linked list members are A→B→C.

In an embodiment, dominant paths may not be determined for every cell in a given cluster of cells. Some cells in a cluster may have relatively low mobility, or a level of mobility that does not justify load balancing operations. Thus, an embodiment may define a dominant path based on a level of transit activity and determine that there is no dominant path in one or more cell.

Figure 9:
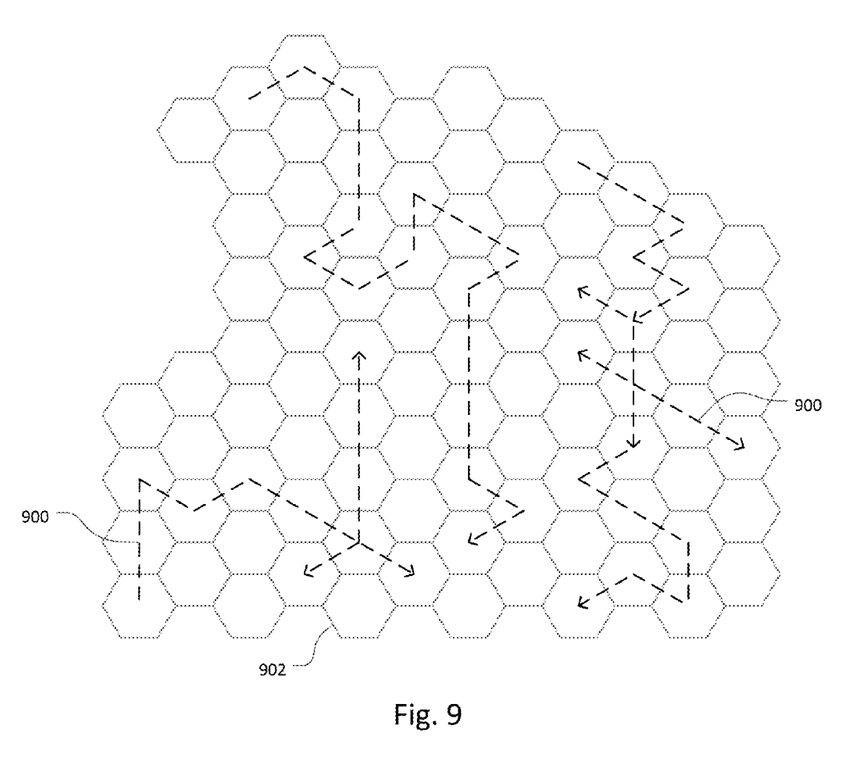
FIG. 9 illustrates an embodiment of a plurality of dominant paths in a cellular network.

FIG. 9 illustrates an example of dominant paths 900 running across a cluster of cells 902. The arrows in the dominant paths 900 indicate a directionality element that is included in the paths. In addition, some of the cells shown in FIG. 9 do not have a dominant path associated with the cells. In some embodiments, clusters of cells will have multiple dominant paths running through them. Some of the paths may form loops in which a path crosses a given cell more than once.

Figure 10:
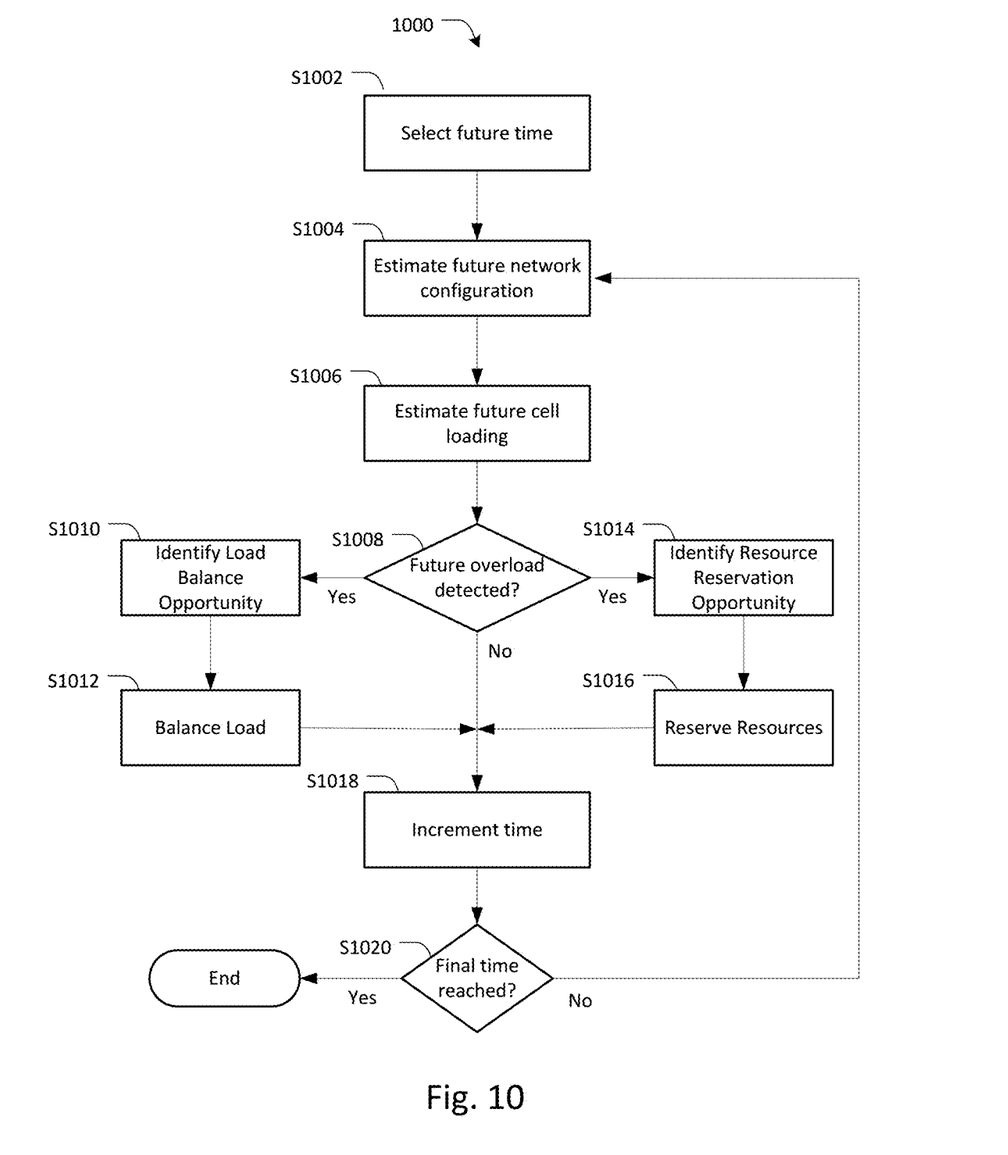
FIG. 10 illustrates an embodiment of a process of predicting future network activity.

FIG. 10 illustrates a process 1000 for predicting future network activity according to an embodiment. A future time may be selected at S1002. In an embodiment, S1002 includes selecting a future time epoch based on a number of minutes from the current time. It can be understood that likelihood of a future network configuration decreases the further into the future the prediction is attempted. Similarly, when the projected solution is based on the mobility of large groups of UEs the solution is more likely to be stable against unexpected motion of one or two users across the network.

A future network configuration is estimated for the selected future time at S1004. In an embodiment, a network configuration includes a number of UEs that are attached to each cell in a cluster that is being analyzed at a given point in time. Estimating a future network configuration may be accomplished by simulating the movement of UEs along dominant paths using average transit times. In a simplified example, when cell A has a dominant path to cell B, 10 cells are currently in cell A, and the average transit time across cell A is 10 minutes, a simulation may determine that 5 UE progress from Cell A to Cell B in 5 minutes.

In some embodiments, UEs can be advanced to neighboring cells according to a ranking of the path (dominant, second order, third order, etc.) with a normalized probability according to the number of handover events associated with the path. An example will now be explained with respect to FIG. 11, which illustrates a cell 1100 with a dominant path 1102 and a second-order path 1104.

Figure 11:
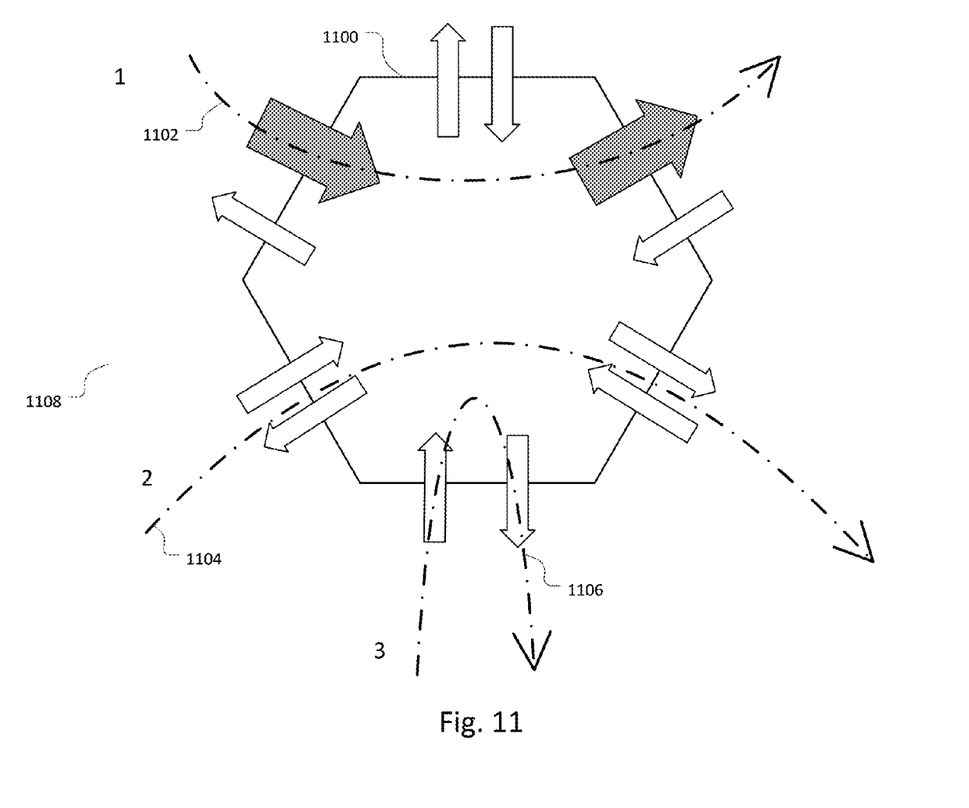
FIG. 11 illustrates multiple orders of dominant paths across a cell according to an embodiment.

In this example, there are 20 hand-out events associated with dominant path 1102 in a given time period, and there are 10 hand-out events associated with second order path 1104 in the same time period. Thus, the probability assigned to dominant path 1102 may be ⅔, and the probability assigned to second order path 1104 may be ⅓. UEs projected along a particular path may be chosen at random from those currently attached to the cell. However, this is merely a simplified example. Other embodiments may employ a larger number of hand-out targets and apportion probabilities accordingly.

In addition, although it was not included in the example, FIG. 11 shows a third order path 1106. For third order path 1106, the hand-in cell is the same as the hand-out cell. Other embodiments may include fourth or higher order paths.

In other words, given a current population of UEs attached to a cell, based on historical trends, a fraction of those UEs would be expected to leave the current cell within a particular time. Since there is no completely reliable way of predicting which particular UEs would actually leave a base station in a future time interval, the particular UEs may be selected at random or according to a statistical preference.

In an embodiment, the probability assigned to a UE following a path may be determined in part by which neighbor cell the UE was previously associated with. In other words, a UE's past handover history could influence the assigned likelihood of transitioning to a future cell from the current cell.

The current UE occupancy of a cell may be used along with the expected net inflow/outflow along the dominant paths defined for a cluster of cells in order to estimate the future network configuration. In some embodiments, the transit rate along a dominant path may vary from cell to cell. Such variation implies that certain cells will experience a net increase or decrease in their occupancy over time.

Various embodiments may statistically generalize UE or treat UE as specific individual entities. For example, a statistically generalized embodiment may use average transit times and activity levels regardless of the specific identities of UE in the cells. In contrast, another embodiment may use data that is specific to particular UE, detect the presence of those UE in cells, and include data specific to that UE when estimating future network conditions.

In an embodiment, the probability assigned to a UE following a path might also be determined in part by the speed of the UE determined by observing its historical location change in time. In addition, the probability assigned a UE following a path might also be determined in part by whether the UE transitioned from IDLE to ACTIVE within a coverage cell. In particular, UE that transitioned from IDLE to ACTIVE during the time period may be excluded from future activity predictions, or analyzed separately from UE which enter and leave the cell in an ACTIVE state without entering an IDLE state.

Future cell loading may be estimated at S1006 based on historical activity levels. The activity level may be applied on a per-UE basis from average historical values. For example, if UE activity during a prior time period had an average data throughput of N bytes per UE, then the future cell load may be estimated by multiplying the N bytes per UE by the number of UE that are expected to occupy the cell at a future time. Thus, a future level of cell activity may be estimated for a plurality of cells in a network.

In an embodiment, using the estimated future configuration from S1004, the estimated loading of the cell can be determined by summing the current activity metrics of UEs projected to be in the cell at a selected future epoch. One possible process performed based on examining the current activity of the UEs is predicting the loading on a future base station if the UEs are anticipated to be in that base station based on their mobility path.

At S1008, a probability of a future overload condition is determined Determining the future overload condition may include comparing the estimated future cell loading to the resources that are available at the cells. If a future overload condition is detected, then a load balancing opportunity may be identified at S1010. A load balancing opportunity may be identified by evaluating network resources and distribution of UE in affected cells. In an embodiment, identifying a load balance opportunity may automatically occur when a future overload condition is detected. In other words, a network may be configured to automatically undertake load balancing activities when a future overload condition is detected.

One of the load balancing activities may be distributing load balancing information in a system. For example, an NRC may create and send a load balance message to one or more base station. The load balance message may include the identity of one or more base station that is predicted to be affected by the overload condition, the time of the projected overload condition, the expected future load of the base stations and the load balance outcome targets from the NRC's perspective.

In an embodiment, the load balance message is advisory in nature and the base stations involved may choose to ignore or modify suggested actions. In addition, because the anticipated network configuration is not certain to occur, the proactive load balance messages may be subject to updates as the mobility state of the network evolves. Accordingly, there may be a tradeoff between prospective changes in advance of predicted conditions, and modifying the actions, and modifications to those changes as actual conditions evolve which are different from the predictions.

In an embodiment, load balancing is proactively performed at S1012 at a time to benefit from an early overload warning, while still allowing sufficient time for the network to react and prevent or mitigate the overload before it occurs. It is understood that in an embodiment, a sufficient time depends on the type of mobile network and usage. In specific embodiments, the time may be five minutes, fifteen minutes, 30 minutes, or an hour.

Balancing a load at S1012 may include handing over UE between neighboring cells in order to achieve a load balance objective communicated in an advisory message. In an embodiment, the objective is to offload base station coverage load to neighbor base stations in anticipation of a future overload condition that is predicted to occur in the near future. Although the term "load balancing" is used here, embodiments may employ other processes for normalizing the distribution of processing activities across a plurality of cells.

When a future overload condition is detected at S1008, a resource reservation opportunity may be identified at S1014 based on the estimated future network configuration from S1004 and/or the estimated future cell loading from S1006. Identifying a resource reservation opportunity S1014 may be performed as in addition to or as an alternative to identifying a load balance opportunity at S1010.

When a resource reservation opportunity is identified, the NRC may transmit resource reservation information to affected base stations in the network. At S1016, base stations may pre-arrange handover resources in cooperation with former serving or future target base stations in order to reduce setup latency and make the handover process more reliable by reducing the time criticality of the process. Another example of resource reservation involves bearer channels from the base station into the network core, which may be set up but not committed until the predicted associated UEs actually arrive in the base station. In an embodiment, as discussed above with respect to load balancing activities, the base stations may or may not actually reserve resources based on the resource reservation information.

If no future overload condition is detected at S1008, then the time may be incremented at S1018. Incrementing the time may include advancing the prediction time by a predetermined value, such as one minute, 5 minutes, or one hour. The system may then check to see if a final time is reached at S1020. If the final time has been reached, then the process ends, and if not, the process repeats for the new incremented time by looping back to estimating a future network configuration for the new incremented time at S1004.

The broad teachings of this disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for a wireless communications network, the method comprising:
   receiving activity data for a plurality of cells;
   determining dominant paths for each of a plurality of cells based on the activity data;
   predicting a future network condition based on the dominant paths; and
   allocating network resources based on the predicted future network condition,
   wherein the activity data includes handover information for the plurality of cells.

2. The method of claim 1, wherein the handover information includes identities of cells from which user equipment was handed-in to a target cell of the plurality of cells, the identities of one or more cells to which user equipment was handed-out from the target cell, a quantity of hand-in events to the target cell within a time period, and a quantity of hand-out events from the target cell within the time period.

3. The method of claim 1, wherein the handover information is recorded in a transit event record that further includes identities of user equipment associated with the hand-in and hand-out events, transit times for the user equipment, and transitions between idle and active states for the user equipment.

4. The method of claim 1, wherein the handover information includes times at which user equipment were handed into and out of a target cell of the plurality of cells within a time period.

5. The method of claim 1, wherein determining dominant paths includes:
   determining a cell to which a majority of user equipment occupying a target cell are handed-out within a time period; and
   designating a path from the target cell to the cell to which the majority of user equipment were handed-out as the dominant path.

6. The method of claim 5, wherein determining dominant paths further includes:
   determining a cell from which a majority of user equipment occupying a target cell are handed-in within a time period; and
   designating a path from the cell to which the majority of user equipment were handed-in to the target cell as the dominant path.

7. The method of claim 5, wherein determining dominant paths includes determining a first order path from the target cell and determining a second order path from the target cell, and
   wherein the first order path is a path to a cell which received the largest number of handouts from the target cell within the time period, and the second order path is a path to a cell which received the second largest number of handouts from the target cell within the time period.

8. The method of claim 5, wherein determining dominant paths further comprises:
   correlating a plurality of transit events across the target cell with identities of user equipment which performed the transit events.

9. The method of claim 8, further comprising:
   determining a transit latency value for the target cell based on the correlated plurality of transit events.

10. The method of claim 1, wherein predicting the future network conditions comprises:
    simulating movement of user equipment along the dominant paths using average transit times.

11. The method of claim 10, wherein the simulated movement is based on current locations of user equipment in the network.

12. The method of claim 1, wherein allocating network resources includes handing over user equipment from cells of the plurality of cells that are predicted to be overloaded.

13. The method of claim 1, wherein allocating network resources includes reserving resources for the plurality of cells to account for the predicted future network conditions.

14. The method of claim 1, wherein the dominant paths include linked lists of neighbor cells sharing dominant path designators.

15. A communications system comprising:
    a processor;
    a receiver that receives activity data including handover information for a plurality of cells;
    a memory that stores the activity data for the plurality of cells; and
    at least one non-transitory computer readable medium with executable instructions stored thereon which, when executed by the processor, perform the following operations:
    determining dominant paths for each of a plurality of cells based on the activity data;
    predicting a future network condition based on the dominant paths; and
    allocating network resources based on the predicted future network condition.

16. The communications system of claim 15,
    wherein the handover information includes identities of cells from which user equipment was handed-in to a target cell of the plurality of cells, the identities of one or more cells to which user equipment was handed-out from the target cell, a quantity of hand-in events to the target cell within a time period, and a quantity of hand-out events from the target cell within the time period.

17. The communications system of claim 16, wherein the handover information is recorded in a transit event record that further includes identities of user equipment associated with the hand-in and hand-out events, transit times for the user equipment, and transitions between idle and active states for the user equipment.

18. The communications system of claim 15, wherein the activity data includes handover information for the plurality of cells, and
    wherein the handover information includes times at which user equipment were handed into and out of a target cell of the plurality of cells within a time period.

19. The communications system of claim 15, wherein dominant paths are determined by:
    determining a cell to which a majority of user equipment occupying a target cell are handed-out within a time period; and
    designating a path from the target cell to the cell to which the majority of user equipment were handed-out to as the dominant path.

20. The communications system of claim 15, wherein dominant paths are determined by:
    determining a cell from which a majority of user equipment occupying a target cell are handed-in within a time period; and designating a path from the cell from which the majority of user equipment were handed-in to the target cell as the dominant path.

21. The communications system of claim 15, wherein determining dominant paths includes determining a first order path from the target cell and determining a second order path from the target cell, and
wherein the first order path is a path to a cell which received the largest number of handouts from the target cell within the time period, and the second order path is a path to a cell which received the second largest number of handouts from the target cell within the time period.

22. The communications system of claim 15, wherein determining dominant paths further includes correlating a plurality of transit events across the target cell with identities of user equipment which performed the transit events, and
wherein a transit latency value for the target cell is determined based on the correlated plurality of transit events.

23. The communications system of claim 15, wherein predicting the future network conditions includes simulating movement of user equipment along the dominant paths using average transit times.

24. The communications system of claim 15, wherein allocating network resources includes handing over user equipment from cells of the plurality of cells that are predicted to be overloaded.

25. The communications system of claim 15, wherein allocating network resources includes reserving resources for the plurality of cells to account for the predicted future network conditions.

26. A non-transitory computer readable medium with computer executable instructions stored thereon that, when executed by a processor, perform the following method:
receiving activity data for a plurality of cells;
determining dominant paths for each of a plurality of cells based on the activity data;
predicting a future network condition based on the dominant paths; and
allocating network resources based on the predicted future network condition,
wherein the activity data includes handover information for the plurality of cells.

27. A method for a wireless communications network, the method comprising:
receiving activity data for a plurality of cells;
determining dominant paths for each of a plurality of cells based on the activity data;
predicting a future network condition based on the dominant paths; and
allocating network resources based on the predicted future network condition,
wherein predicting the future network conditions includes simulating movement of user equipment along the dominant paths using average transit times.

28. A method for a wireless communications network, the method comprising:
receiving activity data for a plurality of cells;
determining dominant paths for each of a plurality of cells based on the activity data;
predicting a future network condition based on the dominant paths; and
allocating network resources based on the predicted future network condition,
wherein allocating network resources includes handing over user equipment from cells of the plurality of cells that are predicted to be overloaded.

29. A method for a wireless communications network, the method comprising:
receiving activity data for a plurality of cells;
determining dominant paths for each of a plurality of cells based on the activity data;
predicting a future network condition based on the dominant paths; and
allocating network resources based on the predicted future network condition,
wherein allocating network resources includes reserving resources for the plurality of cells to account for the predicted future network conditions.

* * * * *